(12) United States Patent
Yoon et al.

(10) Patent No.: US 6,490,147 B2
(45) Date of Patent: Dec. 3, 2002

(54) HIGH-Q MICROMECHANICAL DEVICE AND METHOD OF TUNING SAME

(75) Inventors: Jun-Bo Yoon, Taejon (KR); Clark T.-C. Nguyen, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/878,483

(22) Filed: Jun. 11, 2001

(65) Prior Publication Data

US 2002/0125030 A1 Sep. 12, 2002

Related U.S. Application Data

(60) Provisional application No. 60/263,812, filed on Jan. 24, 2001, now abandoned.

(51) Int. Cl.[7] .............................................. H01G 5/06
(52) U.S. Cl. ...................................... 361/298.3; 361/290
(58) Field of Search ........................... 361/298.3, 298.2, 361/277, 290, 297, 299.4, 299.2

(56) References Cited

U.S. PATENT DOCUMENTS

| 4,849,852 A |  | 7/1989 | Mullins |
| 5,602,411 A |  | 2/1997 | Zettler |
| 5,696,662 A | * | 12/1997 | Bauhahn ..................... 361/290 |
| 5,959,516 A |  | 9/1999 | Chang et al. |
| 6,094,102 A |  | 7/2000 | Chang et al. |

FOREIGN PATENT DOCUMENTS

| JP | 57140081 | 2/1984 |
| JP | 04276263 | 5/1994 |
| JP | 07103903 | 11/1996 |
| WO | WO 98/01761 | 1/1998 |

\* cited by examiner

*Primary Examiner*—Anthony Dinkins
(74) *Attorney, Agent, or Firm*—Brooks & Kushman P.C.

(57) ABSTRACT

A high-Q micromechanical device such as a capacitor and method of tuning same by electrostatically moving the capacitor's dielectric are provided. The high-Q, tunable, micromechanical capacitor is realized using an IC-compatible, electroplated-metal, surface-micromachining technology and demonstrates quality (Q−) factors in excess of 290—the highest reported to date for on-chip tunable capacitors at frequencies near 1 GHz. When combined with on-chip (or off-chip) high-Q inductors, these tunable capacitors are expected to be useful for not only low-phase noise integrated VCO applications, but also for tunable, low-loss, RF filters and tunable matching networks, both key functions capable of enhancing the multi-band programmability of wireless communication handsets. The key feature in this design that makes possible such high on-chip Q is the method for capacitive tuning, which is based on moving the dielectric between the capacitor plates, rather than moving the plates themselves, as done in previous designs. One version of the design achieves a measured Q of 291 at 1 GHz (C=1.21 pF) with a tuning range of 7.7% over 10 V of control voltage, and an expected self-resonant frequency (SRF) of 19 GHz. In another version of the design, with a wider tuning range of 40% over 10 V, a Q of 218 is achieved at 1 GHz (C=1.14 pF).

20 Claims, 2 Drawing Sheets

HIGH-Q MICROMECHANICAL DEVICE AND METHOD OF TUNING SAME

CROSS-REFERENCE TO RELATED APPLICATION

This application claims the benefit of U.S. provisional application Ser. No. 60/263,812, filed Jan. 24, 2001 now abandoned, entitled "High-Q Tunable Micromechanical Capacitor With Movable Dielectric."

STATEMENT REGARDING FEDERALLY SPONSORED RESEARCH OR DEVELOPMENT

The invention was made with government support under Contract No. F30602-97-2-0101 provided by DARPA. The United States government has certain rights in the invention.

BACKGROUND OF THE INVENTION

1. Field of the Invention

This invention relates to high-Q micromechanical devices such as capacitors and capacitive switches and methods of tuning same.

2. Background Art

Micromechanical tunable capacitors constructed using MEMS technology have previously been demonstrated with Q's on the order of 60—a value that greatly exceeds those achievable by semiconductor diode counterparts fabricated via conventional IC technology. Such micromechanical capacitors often consist of suspended top metal plates that can be electrostatically displaced (via applied voltages) over bottom metal plates to vary the capacitance between the plates. Because these capacitors can be constructed in low resistivity metal materials, they exhibit much larger Q's that their semiconductor diode counterparts, which suffer from greater losses due to excessive semiconductor series resistance. To date, micromechanical capacitors have been successfully applied toward the implementation of on-chip, high-Q LC tanks for use in low-phase noise, communications-grade voltage-controlled oscillators (VCO's).

Recent advances in micromechanical tunable capacitor technology, however, are beginning to extend the application range of such devices beyond the initial focus on LC tanks for VCO's, toward the new challenge of tunable preselect filters for multi-band reconfigurable wireless communication handsets. For this application, much higher Q's are required, on the order of 200 or more. Despite the use of metal in their construction, the Q of micromechanical capacitors to date is still limited by losses arising from the finite resistivity of their metal suspension beams, which often must be made long to attain stiffness values low enough to insure sufficiently low actuation voltages. In effect, traditional micromechanical capacitor designs clearly exhibit a Q versus actuation voltage trade-off.

The U.S. patent to Bauhahn, 5,696,662, discloses an electrostatically-operated micromechanical capacitor which is tunable by moving pairs of plates linearly relative to each other through the application of a voltage to the plates.

The U.S. patents to Chang et al., U.S. Pat. Nos. 5,959,516 and 6,094,102, disclose a high-Q MEMS capacitor wherein a central voltage applied to a master or central capacitor sets the capacitance of a slave or signal capacitor.

SUMMARY OF THE INVENTION

An object of the present invention is to provide a high-Q micromechanical device such as a capacitor and method of tuning same which break the above trade-off by eliminating the need for lengthy top plate suspension beams. Specifically, rather than implement tunability using a movable top plate, the top plate is made stationary, and the dielectric between the metal plates is made movable. In effect, capacitive tuning is attained via a tunable-dielectric, realized via a movable dielectric plate suspended by dielectric beams that do not impact the Q of the device, and hence, allow Q's of up to 290 and above.

In carrying out the above object and other objects of the present invention, a high-Q micromechanical device such as a capacitor is provided. The capacitor includes a substrate, a pair of conductive layers supported on the substrate and having a capacitive gap therebetween, and a dielectric disposed in the gap between the conductive layers. The capacitor also includes means for displacing the dielectric within the gap between the conductive layers to tune the capacitor over a tuning range.

The means for displacing may electrostatically displace the dielectric in the gap.

The capacitor may further include at least one spring element coupled to the dielectric to move the dielectric between the layers.

The at least one spring element may include a lateral or vertical spring element supported on the substrate.

One of the conductive layers may form at least a portion of a top plate and the other conductive layer may form at least a portion of a bottom plate wherein both of the top and bottom plates are fixed to the substrate.

Each of the conductive layers may be a conductive metal.

The substrate may be a semiconductor substrate.

The tuning range may be based on a ratio of thickness of the dielectric to thickness of the gap between the conductive layers.

A Q factor of the capacitor may be greater than 50, or 200 or even 290.

The device may be a capacitive switch.

Further in carrying out the above object and other objects of the present invention, a method for tuning a micromechanical device such as a capacitor is provided. The method includes providing a pair of conductive layers supported on a substrate and having a capacitive gap therebetween, and providing a dielectric in the gap between the conductive layers. The method further includes applying a voltage bias to the conductive layers to electrostatically displace the dielectric between the conductive layers.

The method may further include moving the dielectric between the layers.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
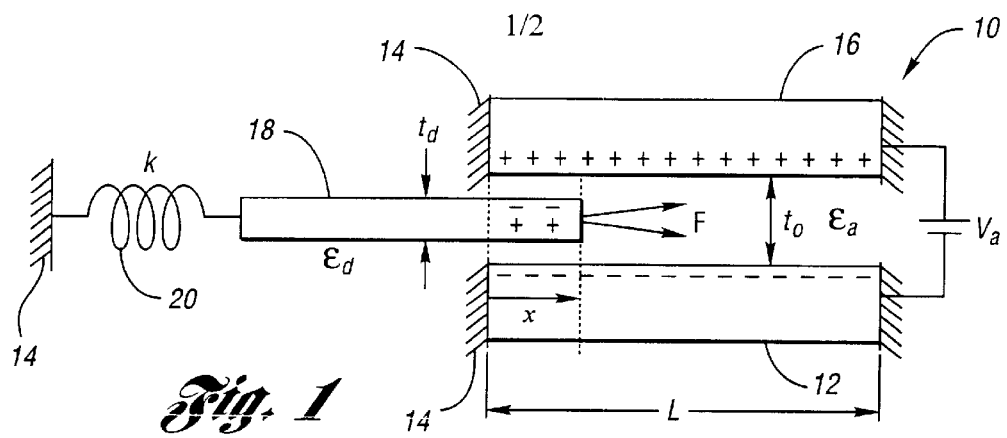
FIG. 1 is a side schematic view of a tunable micromechanical capacitor constructed in accordance with the present invention.
Figure 2:
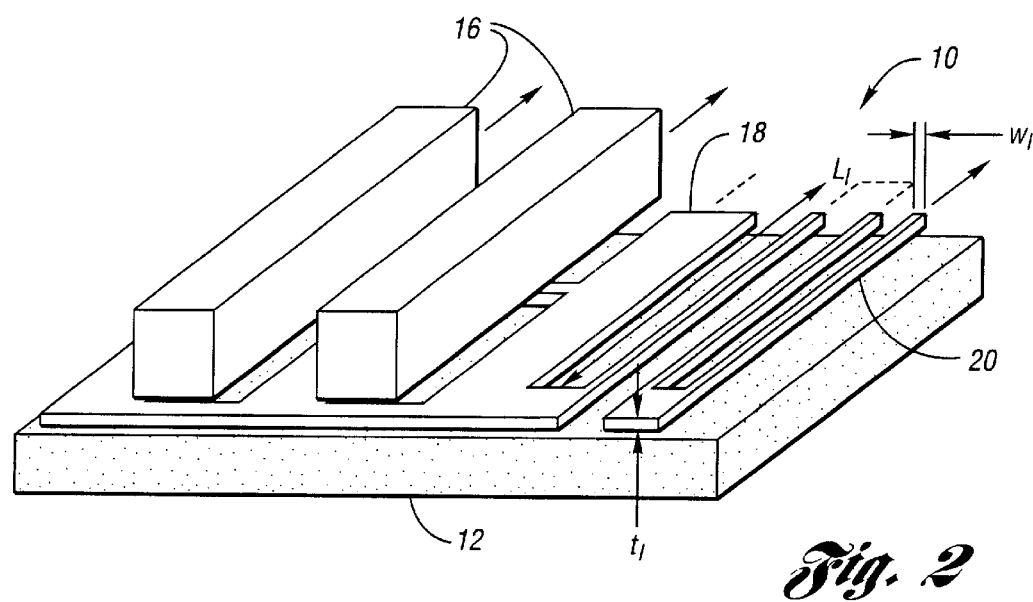
FIG. 2 is a perspective schematic view of the capacitor of FIG. 1 with a lateral/vertical spring element.

Referring now to the drawing figures, FIGS. 1 and 2 present conceptual and perspective view schematics, respectively, of a tunable capacitor of the present invention, generally indicated at 10, identifying key components and specifying a preferred actuation voltage configuration. As shown, the capacitor 10 features a bottom capacitor plate 12 fixed to a substrate 14, and a top capacitor plate 16 suspended above the bottom plate 12, but also rigidly anchored to the substrate 14, and unable to move. Both plates 12 and 16 are constructed of copper (Cu) to minimize their total series resistance, and thus maximize the device Q.

A dielectric slab 18 is suspended between the two plates 12 and 16 and anchored to the substrate 14 outside the two plates 12 and 16 via spring structures 20. This dielectric 18 is free to move, and can be electrostatically displaced to alter either the overlap between it and the capacitor plates 12 and 16, or the fringing fields between them. In the former case, when a DC bias is applied between the two plates 12 and 16, the charges on the capacitor plates 12 and 16 exert an electrostatic force on the induced charges in the dielectric 18 to pull the dielectric 18 into the gap between the plates 12 and 16, as shown in FIG. 1. The waffle shape of the capacitor 10 shown in FIG. 2 is designed to minimize the travel distance (or the needed voltage) required for a given change in capacitance, and to provide etchant access paths during a sacrificial-layer etching step in the fabrication process as described below.

Use of the movable dielectric 18 rather than a movable top capacitor plate (as done in previous designs), provides the tunable micromechanical capacitor 10 of the present invention the following key advantages:

1. Unlike its predecessors, the top capacitor plate 16 does not need to be suspended by lengthy springs that can add series resistance, and thus, lower the Q. Instead, the plate 16 is relatively thick and can be used without any suspension to lower series resistance and greatly increase the Q.
2. As governed by Equation (1) hereinbelow, the tuning range in the capacitor 10 is set by the ratio of the dielectric thickness to the capacitive plate gap, and can be made quite large via proper design, without concern for pull-down phenomena that often limit previous movable-top-plate designs.
3. No top-to-bottom plate electrical shortage can happen in this movable dielectric capacitor 10.

Tunable-Dielectric Capacitor Design

Via appropriate electrostatic analyses, approximate analytical expressions for capacitance C as a function of dielectric displacement x and actuation voltage $V_a$ for the tunable capacitor 10 can be derived and summarized as follows:

$$C = \frac{\varepsilon_a L}{t_0} + \left[ \frac{\varepsilon_a \varepsilon_d}{(\varepsilon_a - \varepsilon_d) t_d + \varepsilon_d t_0} - \frac{\varepsilon_a}{t_0} \right] x \quad (1)$$

$$= \frac{\varepsilon_a}{t_0}\left(L + \frac{a}{1-a}x\right)\left(\text{if } \varepsilon_d \gg \varepsilon_a, a = \frac{t_d}{t_0}\right)$$

$$\therefore \frac{C_{max}(x=L)}{C_{min}(x=0)} \approx \frac{1}{1-a}, \text{ but } \frac{\varepsilon_d}{\varepsilon_a} \text{ at best.}$$

If one substitutes $$x_{eq} = \frac{\varepsilon_a a V_a^2}{2kt_0(1-a)}$$

into Equation (1)

$$C = \frac{\varepsilon_a}{t_0}\left[L + \frac{\varepsilon_a a^2}{2kt_0(1-a)^2}V_a^2\right] \quad (2)$$

where $\varepsilon_a$ and $\varepsilon_d$ are dielectric constants of air and the dielectric, respectively, $t_0$ is the gap between two capacitor plates, $t_d$ is the dielectric thickness, L is the length of the plate, k is the spring constant of the suspensions, and $x_{eq}$ is the equilibrium position of the dielectric when the actuation voltage $V_a$ is applied. The lateral stiffness of the single serpentine spring element 20 or suspension $k_l$ is given by:

$$k_l = \left(\frac{w_l}{L_l}\right)^3 \times t_l E \times \frac{1}{3} \quad (3)$$

where E is Young's modulus of the dielectric material and other variables are indicated in FIG. 2.

Although sufficient for first order design, the above equations do not account for fringing field capacitance, which can contribute significantly to the total capacitance change, especially in structures as complex as that of FIG. 2. Thus, the semiconductor device simulator MEDICI may be used to fine tune capacitance versus voltage transfer functions for the tunable capacitor 10 of the present invention.

Fabrication

FIGS. 3a–3e are side sectional views which illustrate the fabrication process used for the capacitor 10 of the present invention. The process begins in FIG. 3a with the thermal growth of a 1 μm layer 30 of $SiO_2$ to serve as an isolation or dielectric layer between the eventual metal structures and a silicon wafer or substrate 32. Next, the bottom capacitor plate 12 is formed by first evaporating 300 Å/2000 Å a Cr/Cu seed layer 34, then electroplating a 5 μm layer 36 of copper (Cu) (for which the sheet resistance =4.2 mΩ/sq.). A 3000 Å layer 38 of nickel (Ni) is then electroplated above the Cu layer 36 (c.f., FIG. 3a) to serve as a buffer layer to prevent Cu contamination of etch chambers during subsequent RIE processes.

Figure 3A:
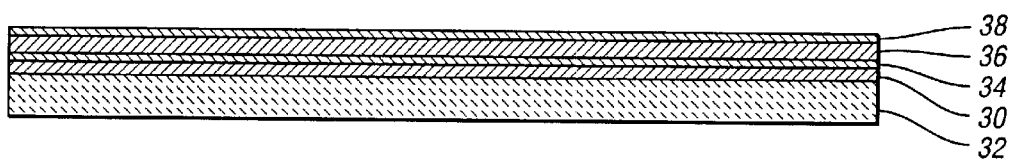
FIGS. 3a–3e are side sectional schematic views illustrating a fabrication process for making the capacitor of the present invention.
Figure 3B:
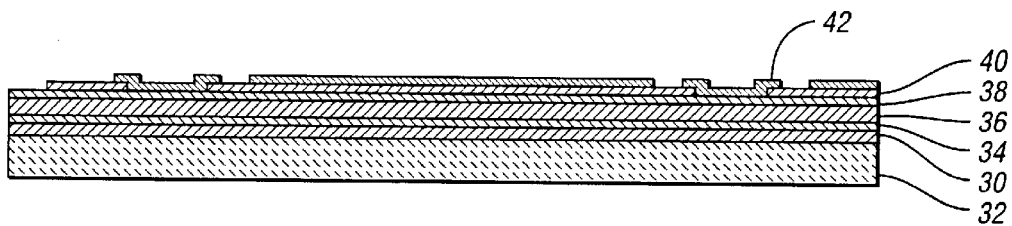
Figure 3C:
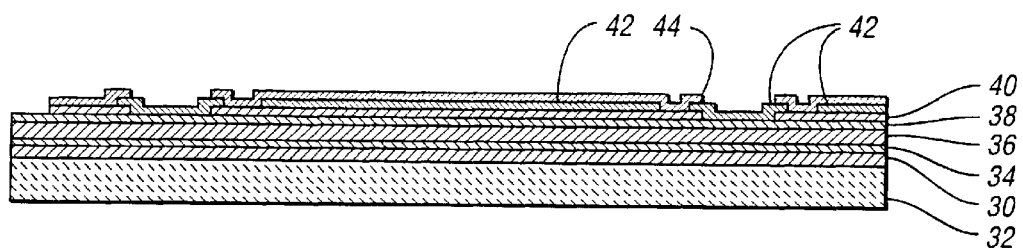

Referring now to FIG. 3b, next, a first 2000 Å aluminum (Al) sacrificial layer 40 is evaporated and patterned to form vias through which a subsequent layer PECVD nitride dielectric film 42 adheres to the underlying Ni layer 38. The nitride film 42 is patterned via RIE to form the movable dielectric plate 18, then submerged under 0.9 μm of a second sacrificial Al film 44 that defines the spacing between the dielectric plate 18 and the eventual top metal plate 16, as shown in FIG. 3c. Due to the valley-like topography between the fingers of the etched dielectric, the deposition of the 0.9 μm layer 44 of Al actually results in only a 0.3 μm gap between the top plate 16 and the dielectric 18 when the two are engaged.

Figure 3D:
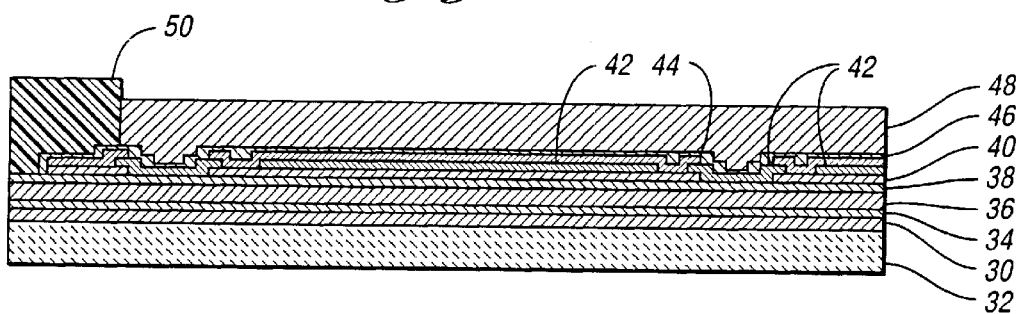
Figure 3E:
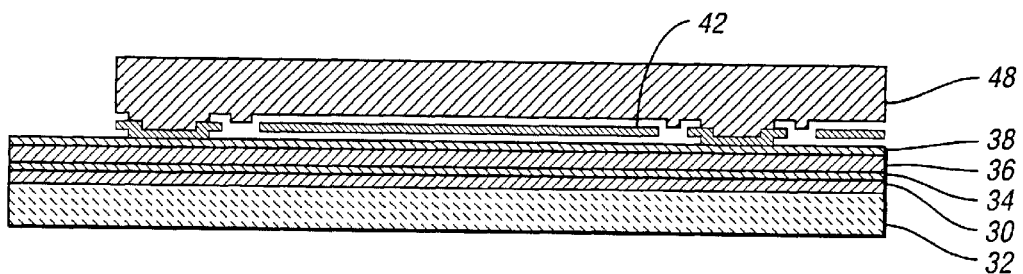

After etching vias through the Al layer 44 to define top plate anchors (c.f. FIG. 3c), as shown in FIG. 3d, the top plate 16 is formed by first evaporating a thin Cr/Cu seed layer 46, then electroplating a Cu layer 48 through a defining photoresist mold 50 to a thickness of 7 μm—thick enough to insure that the top plate 16 does not bend under applied actuation voltages. The PR and seed layer under the PR (but not the seed layer under the top plate structure) are removed at this point. Finally, the two Al sacrificial layers 40 and 44 are selectively etched to release the dielectric 42 using a $K_3Fe(CN)_6$/NaOH solution, which attacks Al, but leaves Cu and the nitride dielectric 42 intact, yielding the final cross-section of FIG. 3e. After release, a critical point dryer is often used to dry the capacitor 10 to prevent stiction. Since all of the process steps in this flow are done at $\leq 200°$ C., this process is amenable to post-IC integration with transistor circuits.

Results and Discussion

To characterize device performance, RF measurements from 0.6 to 6 GHz were made using an HP8753ES s-parameter network analyzer together with GSG-tipped Cascade Microtech microwave probes. Measured and modeled data summarizing the RF performance for the serpentine-spring 20 of device 10 of FIG. 2, show a very high Q of 291 at 1 GHz (1.21 pF), with a tuning bias of 0 V. Using a circuit model to extend its reactance plot, the expected self-resonant frequency (SRF) for this device is 19 GHz.

Figure 4:
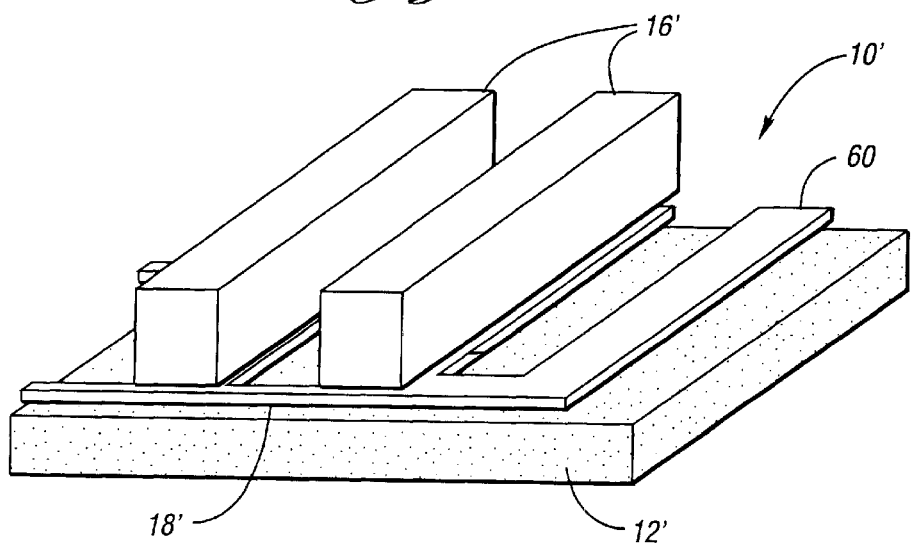
FIG. 4 is a view similar to the view of FIG. 2 but with a vertical spring element.

In addition to the lateral capacitor device 10 described above, FIG. 4 shows the device structure of another capacitor of the present invention, generally indicated at 10', this time employing a vertical spring 60 to move a dielectric 18' only in vertical direction between upper and lower plates 16' and 12', respectively.

This structure operates through a variation in fringing electric fields (fringing capacitance). A fabricated version of this capacitor device 10' benefitted from film stress, and was able to achieve a 40% turning range, with a quality factor of 218 at 1 GHz.

While the best mode for carrying out the invention has been described in detail, those familiar with the art to which this invention relates will recognize various alternative designs and embodiments for practicing the invention as defined by the following claims.

What is claimed is:

1. A high-Q micromechanical device comprising:
    a substrate;
    a pair of conductive layers supported on the substrate and having a capacitive gap therebetween;
    a dielectric disposed in the gap between the conductive layers; and
    DC bias voltage means coupled to the pair of conductive layers for displacing the dielectric to modify the extent to which the dielectric is disposed within the gap between the conductive layers to tune the device over a tuning range.

2. The device as claimed in claim 1 wherein the means for displacing electrostatically displaces the dielectric in the gap.

3. The device as claimed in claim 1 further comprising at least one spring element coupled to the dielectric to move the dielectric between the layers.

4. The device as claimed in claim 3 wherein the at least one spring element includes a lateral spring element supported on the substrate.

5. The device as claimed in claim 3 wherein the at least one spring element includes a vertical spring element supported on the substrate.

6. The device as claimed in claim 1 wherein one of the conductive layers forms at least a portion of a top plate and the other conductive layer forms at least a portion of a bottom plate and wherein both of the top and bottom plates are fixed to the substrate.

7. The device as claimed in claim 6 wherein each of the conductive layers is a conductive metal.

8. The device as claimed in claim 1 wherein the substrate is a semiconductor substrate.

9. The device as claimed in claim 1 wherein the tuning range is based on a ratio of thickness of the dielectric to thickness of the gap between the conductive layers.

10. The device as claimed in claim 1 wherein a Q factor of the device is greater than 50.

11. The device as claimed in claim 10 wherein a Q factor of the device is greater than 200.

12. The device as claimed in claim 11 wherein the Q factor is greater than 290.

13. The device as claimed in claim 1 wherein the device is a capacitor.

14. The device as claimed in claim 1 wherein the device is a capacitive switch.

15. A method for tuning a micromechanical device, the method comprising:
    providing a pair of conductive layers supported on a substrate and having a capacitive gap therebetween;
    providing a dielectric in the gap between the conductive layers; and
    applying a DC voltage bias to the conductive layers to electrostatically displace the dielectric to modify the extent to which the dielectric is disposed between the conductive layers to tune the device over a tuning range.

16. The method as claimed in claim 15 further comprising moving the dielectric between the layers.

17. The method as claimed in claim 15 wherein the device is a capacitor.

18. The method as claimed in claim 15 wherein the device is a capacitive switch.

19. The device as claimed in claim 1 wherein the device is waffle-shaped.

20. The method as claimed in claim 15 wherein the device is waffle-shaped.

* * * * *